US007486932B2

(12) United States Patent
Palin et al.

(10) Patent No.: US 7,486,932 B2
(45) Date of Patent: *Feb. 3, 2009

(54) METHOD AND SYSTEM FOR VOIP OVER WLAN TO BLUETOOTH HEADSET USING ADVANCED ESCO SCHEDULING

(75) Inventors: Arto Palin, Viiala (FI); Mauri Honkanen, Tampere (FI); Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 481 days.

This patent is subject to a terminal disclaimer.

(21) Appl. No.: 11/065,277

(22) Filed: Feb. 25, 2005

(65) Prior Publication Data

US 2006/0194600 A1 Aug. 31, 2006

(51) Int. Cl.
*H04B 7/00* (2006.01)
*H04Q 7/20* (2006.01)

(52) U.S. Cl. ............... 455/41.2; 455/512; 370/338; 370/444

(58) Field of Classification Search .......... 455/512, 455/41.2; 370/338, 444, 455, 445
See application file for complete search history.

(56) References Cited

U.S. PATENT DOCUMENTS

| 6,259,898 | B1 | 7/2001 | Lewis |
| 6,326,926 | B1 | 12/2001 | Shoobridge et al. |
| 6,377,608 | B1 | 4/2002 | Zyren |
| 6,452,910 | B1 | 9/2002 | Vij et al. |
| 2002/0132632 | A1 | 9/2002 | Brassil et al. |
| 2002/0136184 | A1 | 9/2002 | Liang et al. |
| 2004/0071123 | A1 | 4/2004 | Shin |
| 2004/0203367 | A1 | 10/2004 | Nowlin |
| 2005/0215284 | A1* | 9/2005 | Su et al. ............... 455/556.2 |

FOREIGN PATENT DOCUMENTS

EP  1119137  7/2001

(Continued)

OTHER PUBLICATIONS

"Coexistence of Wireless Personal Area Networks with Other Wireless Devices Operating in Unlicensed Frequency Bands", IEEE Standards 802 Part 15.2, Aug. 28, 2003, pp. 1-115.

*Primary Examiner*—Lee Nguyen
(74) *Attorney, Agent, or Firm*—Morgan & Finnegan LLP

(57) ABSTRACT

A system and method are disclosed for reducing interference in simultaneous wireless LAN (WLAN) and wireless personal area network (PAN) signal handling in mobile wireless terminals having both a WLAN and a PAN interface. The wireless terminal includes a first transceiver operating in the PAN network in a communications band and a first communications protocol transmitting first data units. The wireless terminal also includes a second transceiver operating in the WLAN network in substantially the same communications band and a second communications protocol transmitting second data units. The wireless terminal further includes a controller coupled to the first and second transceivers, assigning a higher transmission priority to the second data units than to the first data units when transmission of the second data units overlaps a first occurring transmission of the first data units, to abort transmission of the first occurring data unit. The controller assigns a higher transmission priority to the aborted first data unit than to the second data units when transmission of the second data units overlaps the retransmission of the aborted first data unit, to transmit the aborted first data unit.

42 Claims, 9 Drawing Sheets

FOREIGN PATENT DOCUMENTS

| | | |
|---|---|---|
| EP | 1148677 | 10/2001 |
| EP | 1176731 | 1/2002 |
| EP | 1294048 | 3/2002 |
| EP | 1199842 | 4/2002 |
| EP | 1207654 | 5/2002 |
| EP | 1359779 | 11/2003 |
| EP | 1404071 | 3/2004 |
| EP | 1404072 | 3/2004 |
| EP | 1463241 | 9/2004 |
| EP | 1489788 A2 | 12/2004 |
| WO | WO 01/24454 | 4/2001 |
| WO | WO 01/24455 | 4/2001 |
| WO | WO 01/24456 | 4/2001 |
| WO | WO 01/24457 | 4/2001 |
| WO | WO 01/24458 | 4/2001 |
| WO | WO 01/35540 | 5/2001 |
| WO | WO 01/35578 | 5/2001 |
| WO | WO 01/84789 | 11/2001 |
| WO | WO 02/19743 | 3/2002 |
| WO | WO 02/30022 A2 | 4/2002 |
| WO | WO 02/073430 | 9/2002 |
| WO | WO 03/096617 A2 | 11/2003 |
| WO | WO 2004/023746 | 3/2004 |
| WO | WO 2004/023747 | 3/2004 |
| WO | WO 2004/027565 | 4/2004 |
| WO | WO 2004/045082 | 5/2004 |
| WO | WO 2004/045092 | 5/2004 |
| WO | WO 2004/079998 | 9/2004 |
| WO | WO 2004/079999 | 9/2004 |
| WO | WO 2004/082311 | 9/2004 |

\* cited by examiner

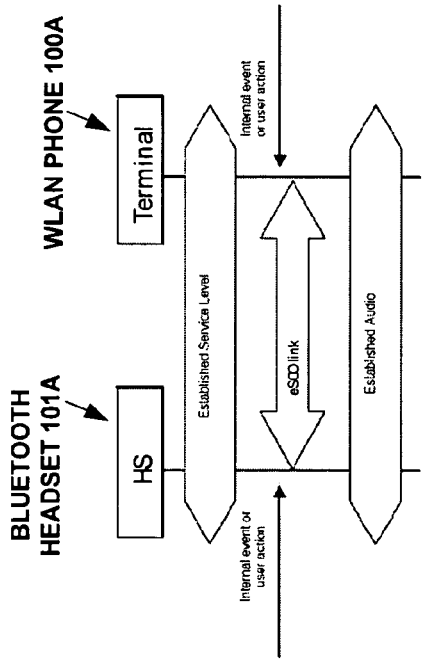
FIG. 3
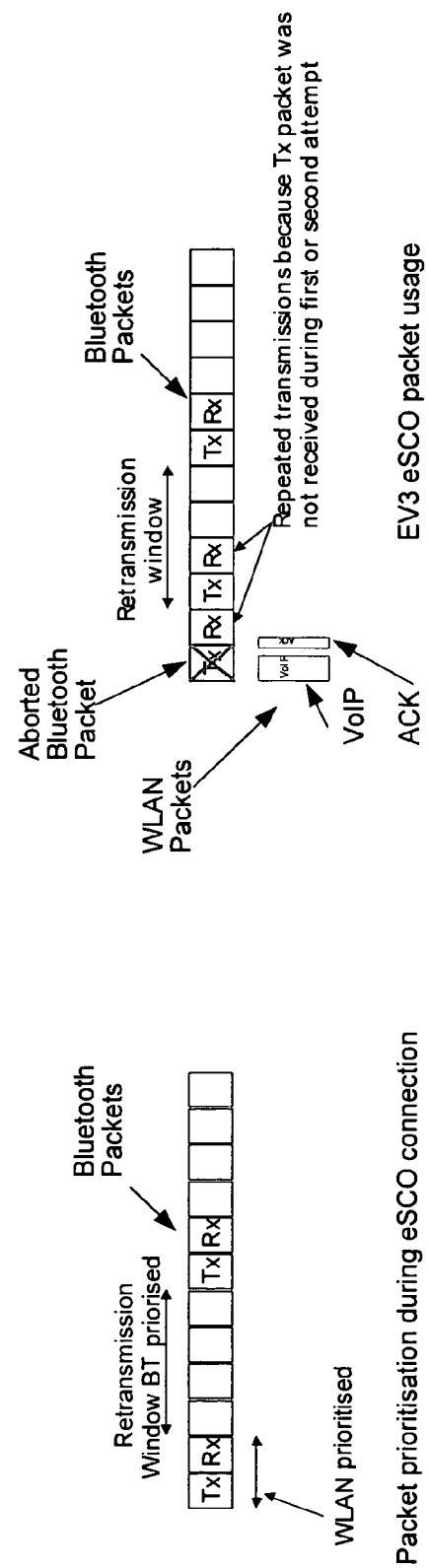
FIG. 4
FIG. 5

3-slot packet usage in BT eSCO increases packet interval

METHOD AND SYSTEM FOR VOIP OVER WLAN TO BLUETOOTH HEADSET USING ADVANCED ESCO SCHEDULING

FIELD OF THE INVENTION

The invention disclosed broadly relates to improvements in mobile wireless terminals having more than one short-range communication interface, for reducing interference in simultaneous signal handling. The invention more particularly relates to reducing interference in voice over IP (VoIP) communications in wireless terminals having both wireless local area network (WLAN) and Bluetooth interface.

BACKGROUND OF THE INVENTION

The best-known example of wireless personal area network (PAN) technology is the Bluetooth Standard, which operates in the 2.4 GHz ISM band. Bluetooth is a short-range radio network, originally intended as a cable replacement. Bluetooth devices are designed to find other Bluetooth devices and Bluetooth access points within their roughly ten meter radio communications range. Bluetooth is a time division multiplexed (TDM) system, where the basic unit is a slot of 625 microsecond duration. Each Bluetooth device may be either a master or a slave at any one time, but not simultaneously. The master device initiates an exchange of data by sending a packet in a slot and the slave device must respond to the master with a packet in the next slot indicating whether it successfully received the prior packet. The slave will not transmit again until the master again transmits to it. The Bluetooth Special Interest Group, *Bluetooth Specification Including Core*, Volume 1.2, Nov. 5, 2003, (hereinafter "Bluetooth v1.2 Specification") describes the principles of Bluetooth device operation and communication protocols. The Bluetooth v1.2 Specification is available from the Bluetooth Special Interest Group at the web site www.bluetooth.com.

A recent specification published by the Bluetooth Special Interest Group, *Specification of the Bluetooth System*, Volume 2.0+EDR, Nov. 4, 2004, (hereinafter "Bluetooth v2+EDR Specification") describes the Enhanced Data Rate (EDR) Bluetooth, which permits speeds up to 2.1 Mbps, which while maintaining backward compatibility. The Bluetooth v2+EDR Specification is available from the Bluetooth Special Interest Group at the web site www.bluetooth.com.

One application of the Bluetooth technology is to carry audio information, which enables designing devices such as wireless headsets. Audio data is carried via Synchronous Connection-Oriented (SCO) packets using coding schemes such as Continuously Variable Slope Delta (CVSD) modulation or a Pulse Code Modulation (PCM). When a SCO link is established, the packets are exchanged over the air between the master and a slave device by alternately transmitting and receiving the encoded audio data in consecutive SCO slots. An example of a Bluetooth wireless headset and a Bluetooth-enabled telephone terminal is shown in FIG. 1. The telephone terminal 100A includes a Bluetooth transceiver module 604 connected to the Bluetooth antenna 102A. The wireless headset 101A also includes a Bluetooth transceiver module connected to its own Bluetooth antenna. Either the headset or the telephone terminal can initially assume the role of the master device, depending on how the connection was initiated. When a SCO link 106A is established between the telephone terminal 100A and the wireless headset 101A, packets are exchanged over the air between the master and slave device by alternately transmitting and receiving the encoded audio data in consecutive SCO slots.

Wireless local area networks (WLAN) cover a larger radio communications range of up to one hundred meters. Examples of wireless local area network technology include the IEEE 802.11 Wireless LAN Standard. The 802.11b standard for wireless local area networks (WLANs), also called Wi-Fi, is part of the 802.11 series of WLAN standards from the Institute of Electrical and Electronics Engineers (IEEE). Networks employing 802.11b operate at radio frequencies in the 2.4 GHz ISM band, the same as that for Bluetooth. Like other 802.11 standards, 802.11b uses the Ethernet protocol and CSMA/CA (carrier sense multiple access with collision avoidance) for path sharing. The modulation method used in 802.11b is complementary code keying (CCK), which allows higher data speeds and is less susceptible to multipath-propagation interference. An example of a WLAN is shown in FIG. 1, where the telephone terminal 100A is a mobile device, which includes an IEEE 802.11b transceiver 602 connected to a WLAN antenna 103A. The WLAN access point 140A shown at location A in FIG. 1 also has an IEEE 802.11b transceiver connected to its own WLAN antenna. When an RF communications link 108A conforming to the IEEE 802.11b Standard is established between the telephone terminal 100A and the access point 140A, data frames containing encoded audio data are exchanged over the WLAN coverage area 150A between the telephone terminal 100A and the access point 140A. The access point 140A is shown connected by wireline to the IP Network 144, to exchange data frames containing voice over internet (VoIP) encoded audio data in a IP network.

FIG. 1 shows a second WLAN access point 140B shown at location B in FIG. 1 connected by wireline to the IP Network 144, establishing a second WLAN coverage area 150B. The WLAN access point 140B has an IEEE 802.11b transceiver connected to its own WLAN antenna. The second WLAN access point 140B communicates with a second telephone terminal 100B, which includes an IEEE 802.11b transceiver connected to a WLAN antenna 103B. When an RF communications link 108B conforming to the IEEE 802.11b Standard is established between the telephone terminal 100B and the access point 140B, data frames containing voice over internet protocol (VoIP) encoded audio data are exchanged over the WLAN coverage area 150B between the telephone terminal 100B and the access point 140B. The telephone terminal 100B includes a Bluetooth transceiver module connected to the Bluetooth antenna 102B. The wireless headset 101B also includes a Bluetooth transceiver module connected to its own Bluetooth antenna. Either the headset or the telephone terminal can initially assume the role of the master device, depending on how the connection was initiated. When a SCO link 106B is established between the telephone terminal 100B and the wireless headset 101B, packets are exchanged over the air between the master and slave device by alternately transmitting and receiving the encoded audio data in consecutive SCO slots. In this manner, voice conversations can be established between users of the wireless headsets 101A and 101B.

The 802.11g specification is another standard for wireless local area networks (WLANs) that offers transmission over relatively short distances at up to 54 megabits per second (Mbps), compared to the 11 Mbps theoretical maximum with the earlier 802.11b standard. Networks employing 802.11g operate at radio frequencies in the 2.4 GHz ISM band, the same band as for Bluetooth and for 802.11b. But, the 802.11g specification employs orthogonal frequency division multiplexing (OFDM) to obtain higher data speed than that for 802.11b. Computers or terminals set up for 802.11g can fall back to speeds of 11 Mbps. This feature makes 802.11b and 802.11g devices compatible within a single network. The IEEE 802.11 Wireless LAN Standard is available from the IEEE, Inc. web site http://grouper.ieee.org/groups/802/11.

Combining the short range PAN (e.g., Bluetooth) and the longer range WLAN (e.g., IEEE 802.11g) features in a unitary, mobile terminal enables a user to tap into area-wide WLAN access points and to operate local I/O devices without a cable connection. An example of such a mobile terminal is the wireless telephone 100A of FIG. 1 that includes both a Bluetooth transceiver and a WLAN transceiver, enabling the user to receive a voice over internet (VoIP) telephone call from a WLAN access point 140A and to converse with the caller using the wireless headset 101A via the Bluetooth connection 106A between the headset and the telephone. A significant problem with a wireless telephone that includes both a Bluetooth transceiver and a WLAN transceiver is that the Wireless LAN and the Bluetooth networks both operate in the 2.4 GHz ISM band and therefore can interfere with each other.

The VoIP telephone call is established over Internet Protocol (IP) by using User Datagram Protocol (UDP) and Real Time Protocol (RTP). VoIP packets carry real time data in the Voice Payload. The standard for transmitting real time data in packet switched networks is ITU standard H.323, which uses RTP/UDP/IP encapsulation. Real-Time Transport Protocol (RTP) supports end-to-end delivery services of applications transmitting real-time data over IP networks. The RTP packet includes an RTP header and the Voice Payload. User Datagram Protocol (UDP) is a connectionless protocol that, like TCP, runs on top of IP networks. The UDP packet includes a UDP header and the RTP packet. UDP/IP offers a direct way to send and receive packets over an IP network. The IP packet includes an IP header, the UDP packet, and a CRC trailer field. The VoIP packet typically delivers 20 ms of speech and the size of the IP packet depends on the voice codec used in encoding the speech stream. The VoIP packet is sent to the mobile terminal 100A using the WLAN link 108A. In mobile terminal the VoIP packet is decoded and then re-encoded with a Bluetooth codec, which is a Continuously Variable Slope Delta (CVSD) modulation codec or a Pulse Code Modulation (PCM) codec described in the Bluetooth v1.2 Specification. In the receiving mode, the coded packet is delivered to the Bluetooth headset 101A and converted to voice. The sequence is reversed in the transmitting mode, although the processing capacity of the headset may limit applicable encoding schemes and hence also technical solutions to the interference problem.

The WLAN frame structure for the IEEE 802.11b standard carries the VoIP packet in the frame body field of the Medium Access Control (MAC) frame defined in the IEEE Standard. Each wireless station and access point in an IEEE 802.11 wireless LAN implements the MAC layer service, which provides the capability for wireless stations to exchange MAC frames. The MAC frame transmits management, control, or data between wireless stations and access points. After a station forms the applicable MAC frame, the frame's bits are passed to the transceiver for transmission. The WLAN data frame carrying a VoIP packet+ACK frame includes several additional components that give it an average duration of approximately 622 microseconds, which is approximately the same duration as a Bluetooth slot. The WLAN data frame begins with an interframe DIFS space of 50 microseconds, which ensures the previous transmission has completed and that it is safe to access the medium again. Next is a back-off wait interval averaging 80 microseconds to allow sharing the medium. Next is a 192 microsecond interval for the synchronization preamble. Next is the MAC frame payload of approximately 87 microseconds, which includes the VoIP packet. This is followed by the SIFS gap of ten microseconds between the data frame and its acknowledgement. This is followed by the WLAN acknowledgement (ACK) frame, which is 203 microseconds duration. The WLAN data frame is transmitted, on average, every twenty milliseconds in both the send and the receive directions.

Interoperability problems arise when WLAN transceivers and Bluetooth transceivers having their own separate antennas 102A and 103A are located in the same terminal 100A and have limited antenna isolation, as shown in FIG. 1. From an integration perspective, it is beneficial to utilize the same antenna and RF filter in a mobile terminal to reduce manufacturing cost and form factor, since both transceivers use the same 2.4 GHz band. In this case the access to the antenna for the WLAN and Bluetooth transceivers is arranged using a switch to connect one or the other of the transceivers to the antenna port at a time. An example of this is shown in FIG. 2 where the single antenna 105A of the terminal 100A is shared by both the Bluetooth transceiver and the WLAN transceiver. Similarly, the single antenna 105B of the terminal 100B is shared by both the Bluetooth transceiver and the WLAN transceiver. This arrangement requires that the Bluetooth and the WLAN transceivers in a terminal operate at different instants, requiring a coordinating control between the transceivers. Such a coordinating control must decide which transceiver can use the channel.

There are different requirements for the control, depending on whether the link is operating in real time for an interactive application, such as telephony, or whether the link is operating in a data transfer mode, such as file transfer protocol (FTP).

The WLAN access point is basically autonomous of the terminal, which has limited capabilities to affect downlink timing. Hence, the WLAN traffic cannot be reliably estimated by the terminal. Thus, when the access point is transmitting to the terminal, potentially many of the WLAN packets can be lost due simultaneous Bluetooth activity or a wrong switch position. To maintain speech integrity, retransmissions are required.

The Bluetooth v1.2 Specification defines different types of logical transports between the master and slave. Five logical transports have been defined:
1. Synchronous Connection-Oriented (SCO) logical transport, described above,
2. Extended Synchronous Connection-Oriented (eSCO) logical transport,
3. Asynchronous Connection-Oriented (ACL) logical transport,
4. Active Slave Broadcast (ASB) logical transport, and
5. Parked Slave Broadcast (PSB) logical transport.

The Synchronous Connection-Oriented (SCO) transports are point-to-point logical transports between a Bluetooth master and a single slave in the piconet. The synchronous logical transports typically support time-bounded information like voice or general synchronous data. The master maintains the synchronous logical transports by using reserved slots at regular intervals. Four packets are allowed on the SCO logical transport: HV1, HV2, HV3 and DV. The HV1 packet has 10 information bytes. The HV2 packet has 20 information bytes. The HV3 packet has 30 information bytes. The DV packet is a combined data and voice packet. On each SCO channel, n-bits are sent and received in consecutive SCO slots once every $T_{SCO}$ slots.

In addition to the reserved slots, the Extended Synchronous Connection-Oriented (eSCO) logical transport provides a retransmission window after the reserved slots. EV packets are used on the synchronous eSCO logical transport. The packets include retransmission if no acknowledgement of proper reception is received within allocated slots. eSCO packets may be routed to the synchronous I/O port. Three eSCO packets have been defined for Bluetooth. The EV3 packet has between 1 and 30 information bytes and may cover up to a single time slot. The EV4 packet has between 1 and 120 information bytes and may cover to up three time slots. The EV5 packet has between 1 and 180 information bytes and may cover up to three time slots. On each eSCO channel, n-bits are sent and received in consecutive eSCO slots once every period of $T_{eSCO}$ slots. Each packet header includes a one-bit acknowledge indication, ARQN, which indicates that the last prior packet was correctly received. With an automatic repeat request scheme, EV packets are retransmitted until acknowledgement of a successful reception is returned by the destination (or timeout is exceeded). As opposed to SCO links, eSCO links can be set up to provide limited retransmissions of lost or damaged packets inside a retransmission window of size $W_{eSCO}$ slots.

The Asynchronous Connection-Oriented (ACL) logical transport is also a point-to-point logical transport between the Bluetooth master and a slave. In the slots not reserved for synchronous logical transport, the master can establish an ACL logical transport on a per-slot basis to any slave, including the slaves already engaged in a synchronous logical transport.

The Active Slave Broadcast (ASB) logical transport is used by a Bluetooth master to communicate with active slaves. The Parked Slave Broadcast (PSB) logical transport is used by a Bluetooth master to communicate with parked slaves.

The Bluetooth link between the terminal and the headset in the prior art typically uses the SCO transport and HV3 packet. Due to the synchronous nature of that transport, Bluetooth traffic can be estimated fairly accurately by the terminal. However, in the SCO transport, there are no retransmissions and therefore if the medium is reserved by the WLAN transceiver in the terminal at a particular moment or if the WLAN transceiver in the terminal is connected to the antenna, the SCO packet is permanently lost. For a VoIP packet received by the terminal from the WLAN access point and intended to be forwarded to the Bluetooth headset, a collision or packet loss will likely occur once every 16 Bluetooth SCO slots, increasing the SCO packet loss by approximately 6%. If HV2 or HV1 packets are used instead of HV3, collisions will occur even more often. Instead, if the medium is being used by the Bluetooth transceiver in the terminal when the WLAN transceiver in the terminal tries to access the medium, the WLAN packet is not permanently lost, but can be retransmitted as provided by the IEEE 802.11 standard. On the average, the WLAN transceiver in the terminal will have to retransmit once every $3^{rd}$ packet, which increases WLAN retransmissions by 30%.

The interference problem of WLAN and Bluetooth transceivers operating in the same terminal has been recognized in the prior art. The IEEE has developed a recommended practice to handle this problem, which is published in the IEEE Standards 802, Part 15.2: *Coexistence of Wireless Personal Area Networks with Other Wireless Devices Operating in Unlicensed Frequency Bands*. This IEEE recommended practice is based on establishing a control block between the WLAN and Bluetooth transceivers in a terminal. The control block assigns a higher priority to Bluetooth transmissions than to WLAN transmissions and selects which one of those transceivers is to be operating at a particular instant.

The first problem with the IEEE recommended practice is that it is only a recommendation and thus it cannot be known whether and how different WLAN transceiver manufacturers will implement this recommendation for access points and mobile terminals. Secondly the IEEE recommended practice assigns the WLAN acknowledgement (ACK) packet to have priority over the Bluetooth packet during WLAN retransmissions of interrupted WLAN packets. This will directly cause some permanent packet losses for the Bluetooth transceiver. Additionally, the IEEE recommended practice does not utilize the more enhanced functionality provided by the later Bluetooth v1.2 Standard, such as the Extended Synchronous Connection-Oriented (eSCO) logical transport or Bluetooth adaptive frequency hopping (AFH). The AFH feature included in the Bluetooth v1.2 Specification could be used to alleviate WLAN and Bluetooth collisions by controlling Bluetooth to avoid hopping on those frequencies that are currently being used by WLAN transmissions. However, the AFH does not help in cases where the antenna isolation is small (i.e. where WLAN and Bluetooth transceivers are integrated into the same terminal, but have separate antennas) or the single antenna is shared between transceivers. Transmission from either of the transceivers over any part of the ISM band will bring the receiver portion of the other transceiver into saturation so that nothing can be received.

What is needed in the prior art is a method to reduce interference in simultaneous WLAN and Bluetooth signal handling, especially in voice over IP communications via a WLAN telephone to a Bluetooth headset.

SUMMARY OF THE INVENTION

The invention solves the problem of reducing interference in simultaneous WLAN and Bluetooth signal handling, especially in voice over IP communications via a WLAN telephone to a Bluetooth headset. The invention provides a new mode of operation for the control block between the WLAN and Bluetooth transceivers in a terminal, which assigns a higher priority to WLAN transmissions than to Bluetooth transmissions and selects which one of those transceivers is to be operating at a particular instant. The invention uses the Extended Synchronous Connection-Oriented (eSCO) logical transport in the Bluetooth protocol and exploits its retransmission window that is available after the reserved slots. The EV packets used on the synchronous eSCO logical transport include retransmission of aborted packets within the retransmission window if the transmission of the last prior Bluetooth packet has been interrupted by a higher priority transmission of WLAN packets. The new control block assigns to the Bluetooth retransmission packet a higher priority over the WLAN packets, to assure retransmission of the interrupted Bluetooth packet.

Further in accordance with the invention, if the headset is initially the master, then after the headset connection has been established, the terminal will perform a role switch to assume the master role. Alternately, the terminal will be the initial master and will retain the role. As the master device, the terminal will set up an EV3-type eSCO link with headset, which enables the headset to use the retransmission feature. After an ACL link has been established by the terminal, one or more eSCO links are set up to the headset. The eSCO links are similar to SCO links using timing control flags and an interval of $T_{eSCO}$ slots in duration. The eSCO link with the headset is set up to provide limited retransmissions of lost or damaged packets inside the retransmission window of size $W_{eSCO}$ slots.

(For example, the headset is configured to support the Hands Free Profile 1.2 with an eSCO repetition period of $T_{eSCO}=6$ slots and an eSCO window size of $W_{eSCO}=2$ slots using the EV3 packet format and CVSD compression encoding.)

During operation of the invention, the WLAN traffic is assigned a higher priority than the Bluetooth eSCO traffic so that the first-time transmission of a Bluetooth packet is suppressed or interrupted when a WLAN packet is simultaneously either being received or transmitted or when it is known that WLAN transmission or reception will happen during a Bluetooth first-time transmission. This can happen, for example, with the RTS (Request to Send) signal or the CTS (Clear to Send) signal to control station access to the WLAN medium, or with the CTS-to-self protection mechanism. The CTS-to-self protection mechanism method sends a CTS message using an 802.11b rate to clear the air, and then immediately follows with data using an 802.11g data rate. To assure that the suppressed or interrupted Bluetooth eSCO packet is eventually retransmitted successfully, the Bluetooth retransmission packet is assigned a higher priority than the WLAN traffic. Any WLAN packet known to have started transmission during the retransmission of a Bluetooth eSCO packet is interrupted. The existing WLAN protocol will later retransmit the interrupted WLAN packet. In effect, collision with WLAN traffic can be reduced by scheduling the Bluetooth eSCO transmission later, if necessary. In this manner WLAN packet retransmissions are used less often than in the prior art, thus imposing less of an encumbrance on the WLAN traffic.

From the headset point of view, when the terminal is in receive mode, the headset can transmit the eSCO packet to the terminal during an eSCO slot. If the headset did not receive the previous eSCO packet from the terminal in the scheduled master-to-slave slot because of a WLAN transmission, the headset will recognize the omission and set the acknowledge indication ARQN bit='0' in its reply eSCO packet. Although the terminal may not receive the reply eSCO packet because of the WLAN transmission, it does not matter because the terminal knows that its last prior eSCO transmission was preempted and it will use the eSCO retransmission window to retransmit the eSCO packet. An advantage of the invention is that it does not require a change to the WLAN or Bluetooth standard, but merely a proprietary change to the Bluetooth and WLAN control logic of the terminal. The headset, itself, operates according the hands free profiles for headsets, which support eSCO.

The resulting invention is particularly advantageous in areas of high WLAN traffic, such as in a business office, where frequent retransmission of interrupted WLAN packets would significantly impair WLAN traffic capacity. A further advantage of the invention is the ability of the terminal to predict the need to transmit Bluetooth packets because SCO and eSCO packets are transmitted at known fixed intervals. Still another advantage of the invention is that it does not require a change to the WLAN or Bluetooth standard, but merely a proprietary change to the Bluetooth and WLAN control logic of the terminal.

In an alternate embodiment of the invention, after the headset connection has been established by the terminal and the terminal is in the master role, the terminal will set up an EV5 eSCO link with headset. The EV5 packet type enables power consumption in the headset to be reduced because the packets are sent less frequently and the protocol-to-packet overhead is smaller. The parameters for the eSCO connection with EV5 packets are $T_{eSCO}=32$ slots and $W_{eSCO}=2$ using EV5 and CVSD voice coding.

The reason to select $T_{eSCO}=32$ slots is that with this value the EV5 eSCO packet is aligned at every 32 slots, which is the same time interval as the average interval of 20 ms for the VoIP WLAN packet. It should also be noted that with these parameters and the maximum EV5 packet data of 180 bytes, the average data rate is 72 kbps, which means that roughly every 12th packet does not have to be sent. Alternately, if a steady 64 kbps data rate is desired, a 160 byte payload can be used. This is not limited to any particular voice coding scheme, but can be used as long as the required data rate is below 72 kbps.

Although establishing the Bluetooth connection with the terminal as the master device is the preferred way to operate the invention, retaining the headset in the role of the master device can also be used to establish the Bluetooth connection. In this alternate embodiment, the terminal and headset are programmed so that the headset remains the master device in establishing the Bluetooth connection. As the master device, the headset will set up the EV3-type eSCO link with the terminal, which enables the headset to use the retransmission feature as described above.

In another alternate embodiment of the invention, the Enhanced Data Rate (EDR) Bluetooth packets can be used, as provided in the Bluetooth EDR protocol. The EDR packets make it possible to increase the Bluetooth voice packet interval and thus also leave more time for WLAN packets to be transmitted. The EDR eSCO packets have the same retransmission feature as the eSCO packets discussed above for the Bluetooth v1.2 Specification and they have the advantage of transmitting at a raw data rate of from 2 Mbps to 3 Mbps. Both one-slot and three-slot EDR packets are available; the one-slot packet is preferred to keep latency to a minimum.

The resulting invention solves the problem of reducing interference in simultaneous WLAN and Bluetooth signal handling, especially in voice over IP communications via a WLAN to a Bluetooth headset.

DESCRIPTION OF THE FIGURES

FIG. 3 is a diagram according to an embodiment of the present invention showing the Basic level audio link setup between the terminal and the Bluetooth headset.

FIG. 4 is a timing diagram according to an embodiment of the present invention showing the Packet prioritisation during the Bluetooth eSCO connection. The WLAN transmissions have a higher priority during normal Bluetooth slots and the Bluetooth retransmissions have a higher priority during Bluetooth retransmission slots.

FIG. 5 is a timing diagram according to an embodiment of the present invention showing the Bluetooth EV3 eSCO packet usage. Bluetooth packets that were interrupted in a prior occurring normal slot are assigned a higher priority and are retransmitted in the following Bluetooth retransmission slots.

DISCUSSION OF THE PREFERRED EMBODIMENT

Figure 1:
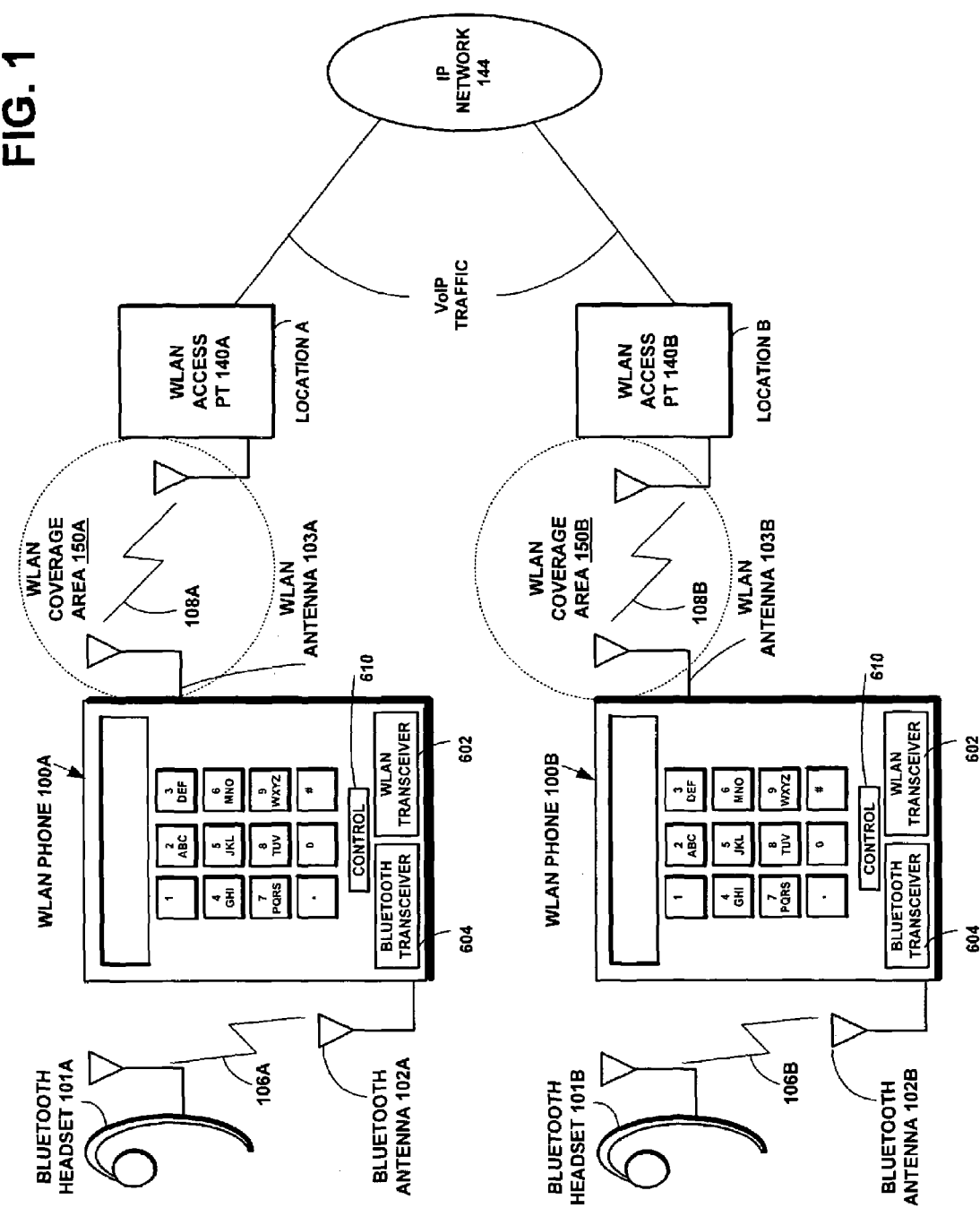
FIG. 1 is a network diagram according to an embodiment of the present invention showing a voice over IP (VoIP) communications network via a WLAN telephone to a Bluetooth headset. The telephone terminal includes a Bluetooth transceiver module connected to a Bluetooth antenna and a WLAN transceiver connected to a separate WLAN antenna.

FIG. 1 is a network diagram according to an embodiment of the present invention showing a voice over IP (VoIP) communications network via a WLAN telephone 100A to a Bluetooth headset 101A. The telephone terminal 100A includes a Bluetooth transceiver 604 connected to a Bluetooth antenna 102A and a WLAN transceiver 602 connected to a separate WLAN antenna 103A. The Bluetooth transceiver 604 operates in the Bluetooth network 106A to communicate with the wireless headset 101A using the ISM band of 2.4 GHz and the Bluetooth v1.2 Specification communications protocol to exchange Bluetooth packets. When a Bluetooth link 106A is established between the telephone terminal 100A and the wireless headset 101A, packets are exchanged over the air between the terminal 100A and the wireless headset 101A by alternately transmitting and receiving the encoded audio data in consecutive Bluetooth slots.

Figure 2:
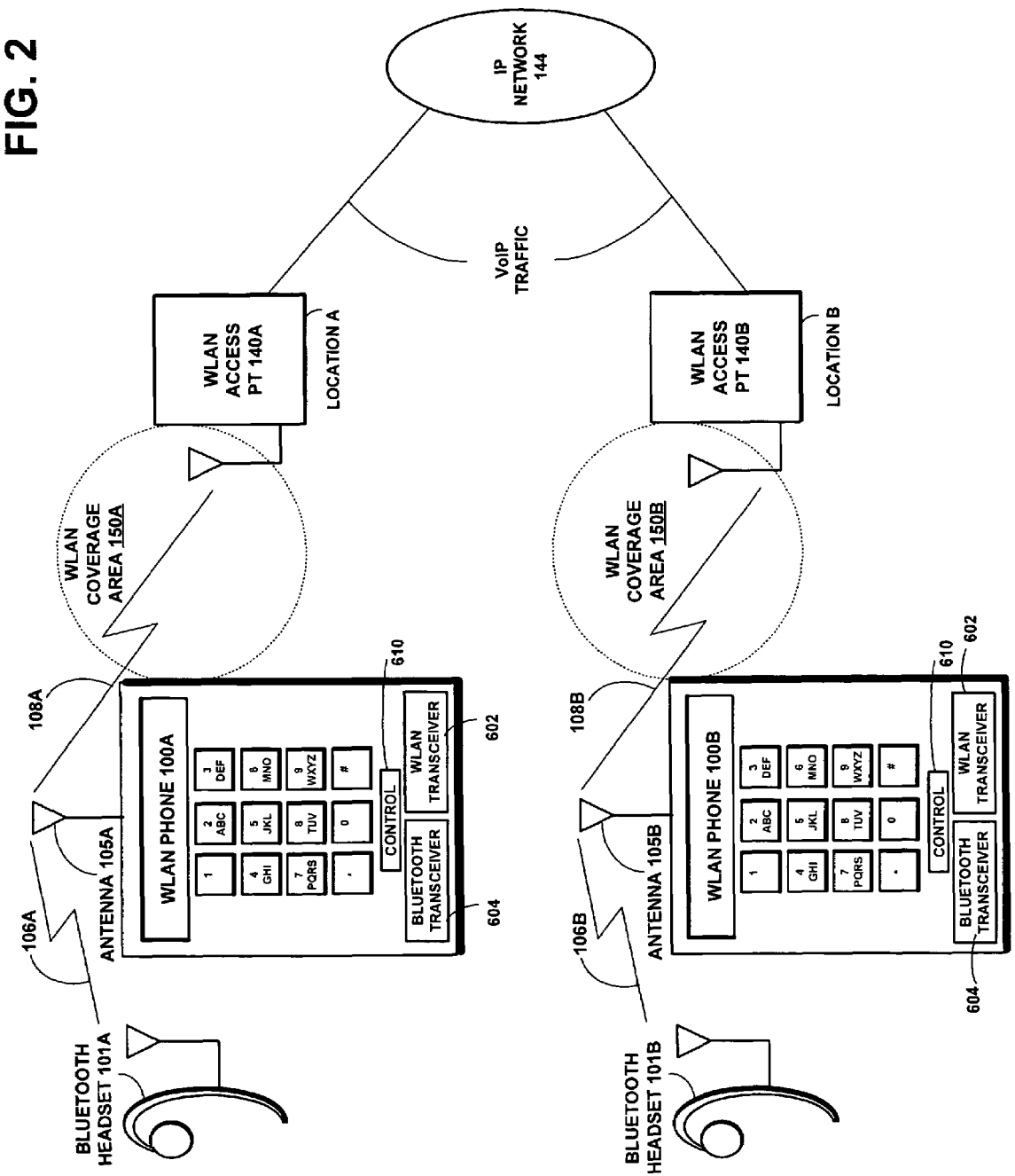
FIG. 2 is a network diagram according to an embodiment of the present invention showing a voice over IP (VoIP) communications network via a WLAN telephone to a Bluetooth headset. The telephone terminal includes a Bluetooth transceiver module and a WLAN transceiver connected to the same antenna.

FIG. 2 shows the same voice over IP (VoIP) communications network as shown in FIG. 1, but with the WLAN telephone terminal 100A having its Bluetooth transceiver 604 and WLAN transceiver 602 connected to the same antenna 105A.

FIG. 3 shows the basic level audio link setup between the WLAN terminal 100A and the Bluetooth headset 101A. The WLAN terminal 100A and the Bluetooth headset 101A exchange inquiry and paging packets to establish a connection and a service level. Then by means of an internal programmed event or user action, the eSCO link is established. After this stage, the basic level audio link is established.

The WLAN access point 140A at location A in FIG. 1 also has an IEEE 802.11b transceiver connected to its own WLAN antenna. When an RF communications link 108A conforming to the IEEE 802.11b Standard is established between the telephone terminal 100A and the access point 140A, data frames containing encoded audio data are exchanged over the WLAN coverage area 150A between the telephone terminal 100A and the access point 140A. The RF communications link 108A can also conform to the IEEE 802.11g Standard. The access point 140A is shown connected by wireline to the IP Network 144, to exchange data frames containing voice over internet (VoIP) encoded audio data in a telephone network.

FIG. 1 shows a second WLAN access point 140B at location B connected by wireline to the IP Network 144, establishing a second WLAN coverage area 150B. The WLAN access point 140B has an IEEE 802.11b transceiver connected to its own WLAN antenna. The second WLAN access point 140B communicates with a second WLAN telephone terminal 100B, which includes an IEEE 802.11b transceiver connected to a WLAN antenna 103B. When an RF communications link 108B conforming to the IEEE 802.11b Standard is established between the telephone terminal 100B and the access point 140B, data frames containing voice over internet (VoIP) encoded audio data are exchanged over the WLAN coverage area 150B between the telephone terminal 100B and the access point 140B. The RF communications link 108B can also conform to the IEEE 802.11g Standard. The telephone terminal 100B includes a Bluetooth transceiver module connected to the Bluetooth antenna 102B. The wireless headset 101B also includes a Bluetooth transceiver module connected to its own Bluetooth antenna. When a Bluetooth link 106B is established between the telephone terminal 100B and the wireless headset 101B, packets are exchanged over the air between the terminal 100B and the wireless headset 101B by alternately transmitting and receiving the encoded audio data in consecutive Bluetooth slots. In this manner, voice conversations can be established between users of the wireless headsets 101A and 101B. FIG. 2 shows the WLAN telephone terminal 100B having its Bluetooth transceiver 604 and WLAN transceiver 602 connected to the same antenna 105B.

Figure 6:
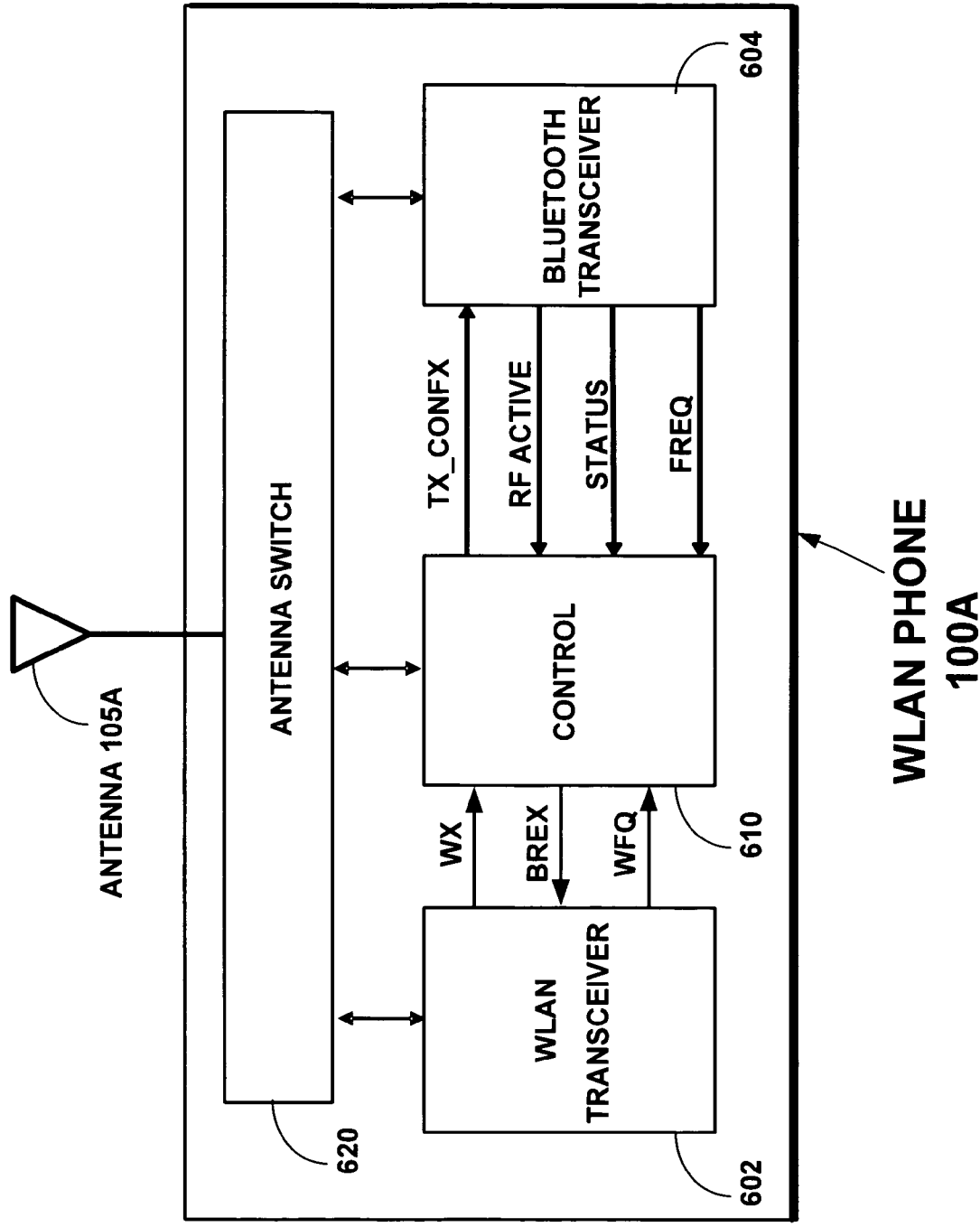
FIG. 6 is a functional block diagram according to an embodiment of the present invention showing the WLAN telephone with a control module that coordinates the operation of the Bluetooth transceiver and the WLAN transceiver.

The invention provides a new mode of operation for the control module or controller 610 shown in FIG. 1 and in greater detail in FIG. 6, between the WLAN transceiver 602 and the Bluetooth transceiver 604 in the terminal 100A, which assigns a higher priority to WLAN transmissions or to channel reservations, for example, with RTS and CTS signaling, than to original Bluetooth transmissions, i.e., a first attempt at transmitting a Bluetooth packet. The control module 610 selects which one of those transceivers is to be operating at a particular instant. The invention uses the Extended Synchronous Connection-Oriented (eSCO) logical transport in the Bluetooth v1.2 Specification, as shown in FIG. 4. FIG. 4 shows the packet prioritisation during the Bluetooth eSCO connection. The WLAN transmissions have a higher priority during normal Bluetooth slots and the Bluetooth retransmissions have a higher priority during Bluetooth retransmission slots. The invention exploits the retransmission window feature in the eSCO logical transport that is available after the reserved slots. EV packets used on the synchronous eSCO logical transport include retransmission of aborted packets within the retransmission window if the transmission of the last prior Bluetooth packet has been interrupted by a higher priority transmission of WLAN packets. Of course this retransmission is utilized also in the case of error in Bluetooth eSCO packet. The control module 610 assigns to the aborted or retransmitted Bluetooth packet a higher priority for its retransmission over the WLAN packets, to assure retransmission of the aborted Bluetooth packet. FIG. 5 shows the Bluetooth EV3 eSCO packet usage. Bluetooth packets that were interrupted in a prior occurring normal slot are assigned a higher priority than WLAN packets and are retransmitted in the following Bluetooth retransmission window.

Figure 7:
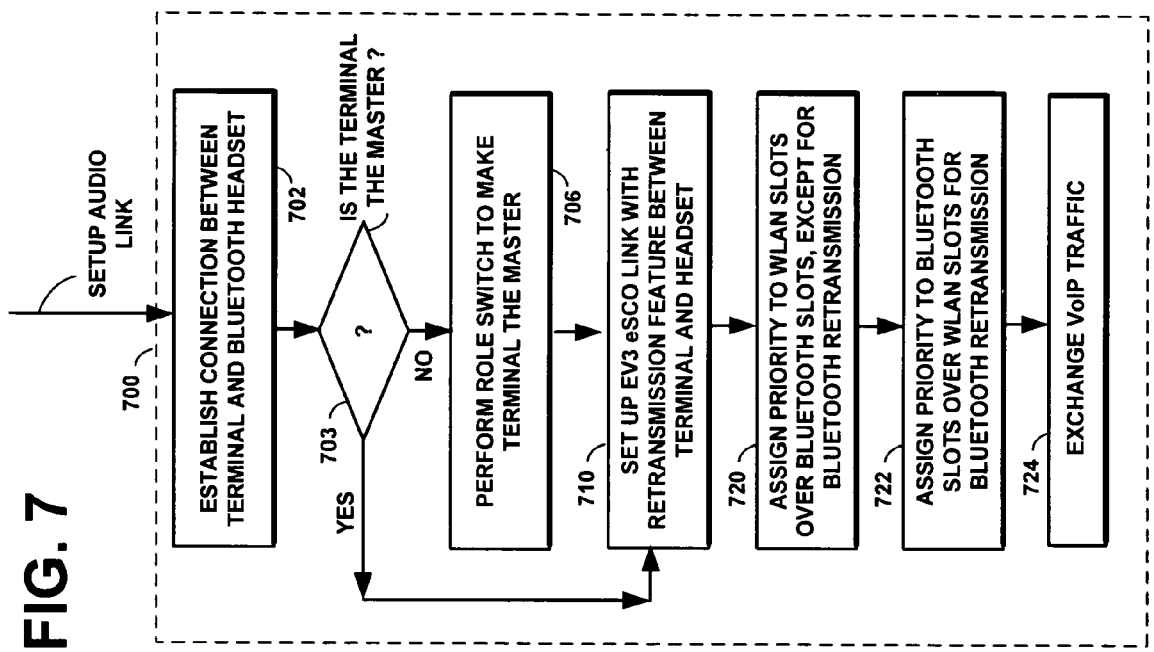
FIG. 7 is a flow diagram according to an embodiment of the present invention showing the process of establishing a connection between the Bluetooth terminal and the Bluetooth headset to exchange voice packets that have been exchanged with the WLAN access point.

Further in accordance with the invention, if the headset is initially the master, then after the headset connection 106A has been established, the terminal 100A will perform a role switch to assume the master role. Alternately, the terminal will be the initial master and will retain that role. As the master device, the terminal 100A will set up an EV3-type eSCO link with headset 101A, which enables the headset 101A to use the retransmission feature. FIG. 7 is a flow diagram showing the process 700 of establishing a connection between the Bluetooth terminal 100A and the Bluetooth headset 101A to exchange voice packets that have been exchanged with the WLAN access point 140A. Step 702 establishes a Bluetooth connection between the terminal 100A and the headset 101A. Step 703 determines if the terminal is the initial master. If it is, then the steps flow to step 710. Alternately, if the terminal is not the initial master, then the steps flow to step 706. In Step 706 the terminal 100A performs a role switch with the headset 101A to make the terminal the master. In Step 710 the terminal 100A sets up an EV3 eSCO link with the retransmission feature between the terminal and the headset. In Step 720 the control module 610 assigns priority to WLAN slots over Bluetooth slots, except for Bluetooth retransmissions. In Step 722 the control module 610 assigns priority to Bluetooth slots over WLAN slots for Bluetooth retransmissions. In Step 724 the terminal 100A, headset 101A, and access point 140A can then begin to exchange VoIP traffic.

After an ACL link has been established by the terminal 100A, one or more eSCO links are set up to the headset 101A. The eSCO links are similar to SCO links using timing control flags and an interval of $T_{eSCO}$ slots in duration. The eSCO link with the headset is set up to provide limited retransmissions of lost or damaged packets inside the retransmission window of size $W_{eSCO}$ slots. (For example, the headset is configured to support the Hands Free Profile 1.2 with an eSCO repetition period of $T_{eSCO}=6$ slots and an eSCO window size of $W_{eSCO}=2$ slots using the EV3 packet format and CVSD compression encoding.)

During operation of the invention, the WLAN traffic is assigned a higher priority than the Bluetooth eSCO traffic so that the first-time transmission of a Bluetooth packet is suppressed or interrupted when a WLAN packet is simultaneously either being received or transmitted or when the channel is reserved to a WLAN access point and a station transmits for example, the RTS (Request to Send) signal, CTS (Clear to Send) signal, or the CTS-to-self protection signal. To assure that the suppressed or interrupted Bluetooth eSCO packet is eventually retransmitted successfully, the Bluetooth retransmission packet is assigned a higher priority than the WLAN traffic. Any WLAN packet known to have started transmission during the retransmission of a Bluetooth eSCO packet is interrupted. The existing WLAN protocol will later retransmit the interrupted WLAN packet. In effect, collision with WLAN traffic can be reduced by scheduling the Bluetooth eSCO transmission later, if necessary. In this manner WLAN packet retransmissions are used less often than in the prior art, thus imposing less of an encumbrance on the WLAN traffic.

Figure 8:
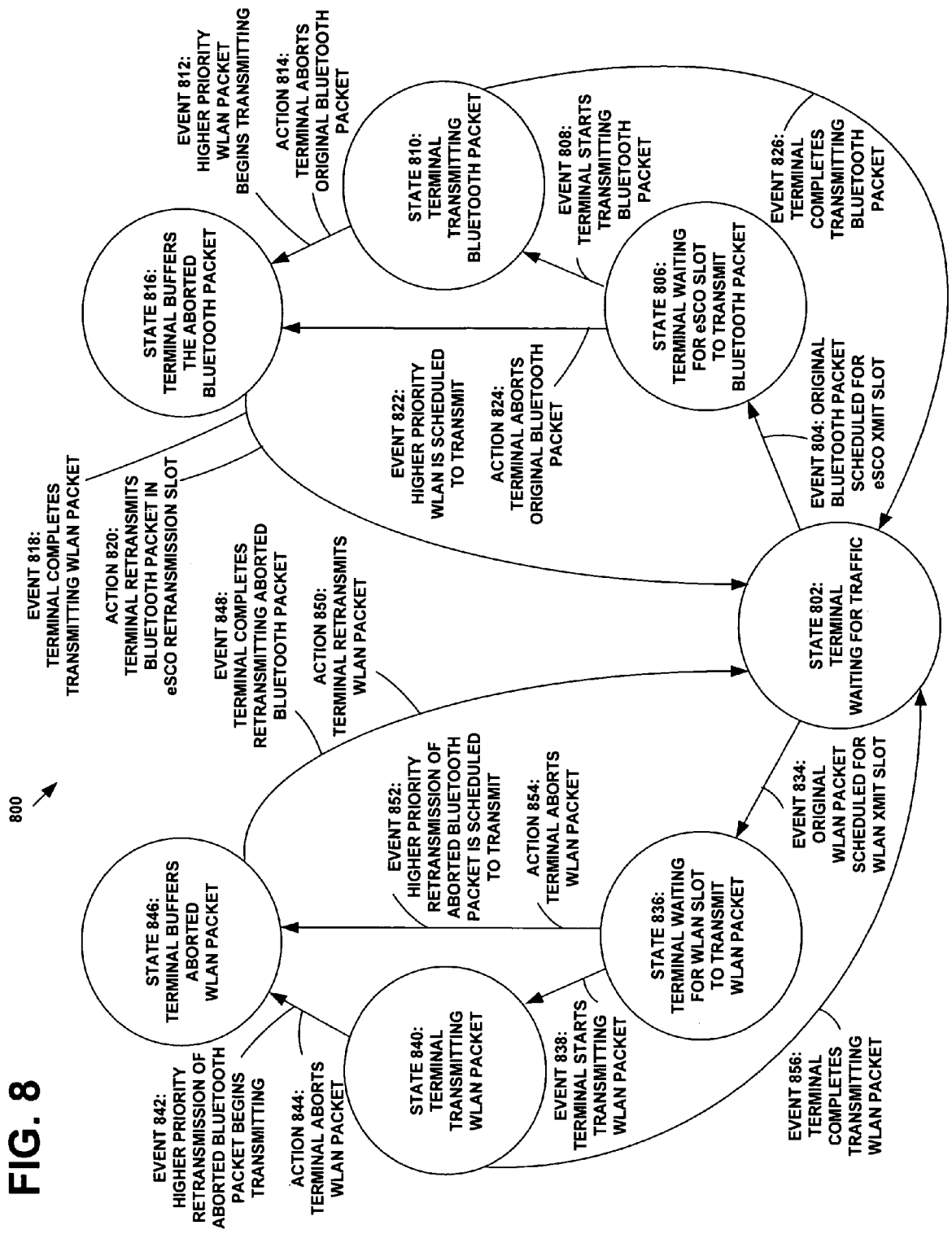
FIG. 8 is a state diagram according to an embodiment of the present invention showing the operating states established by the controller to assign a higher priority to the WLAN transmissions during normal Bluetooth slots and assign a higher priority to the Bluetooth retransmissions during Bluetooth retransmission slots.
Figure 9:
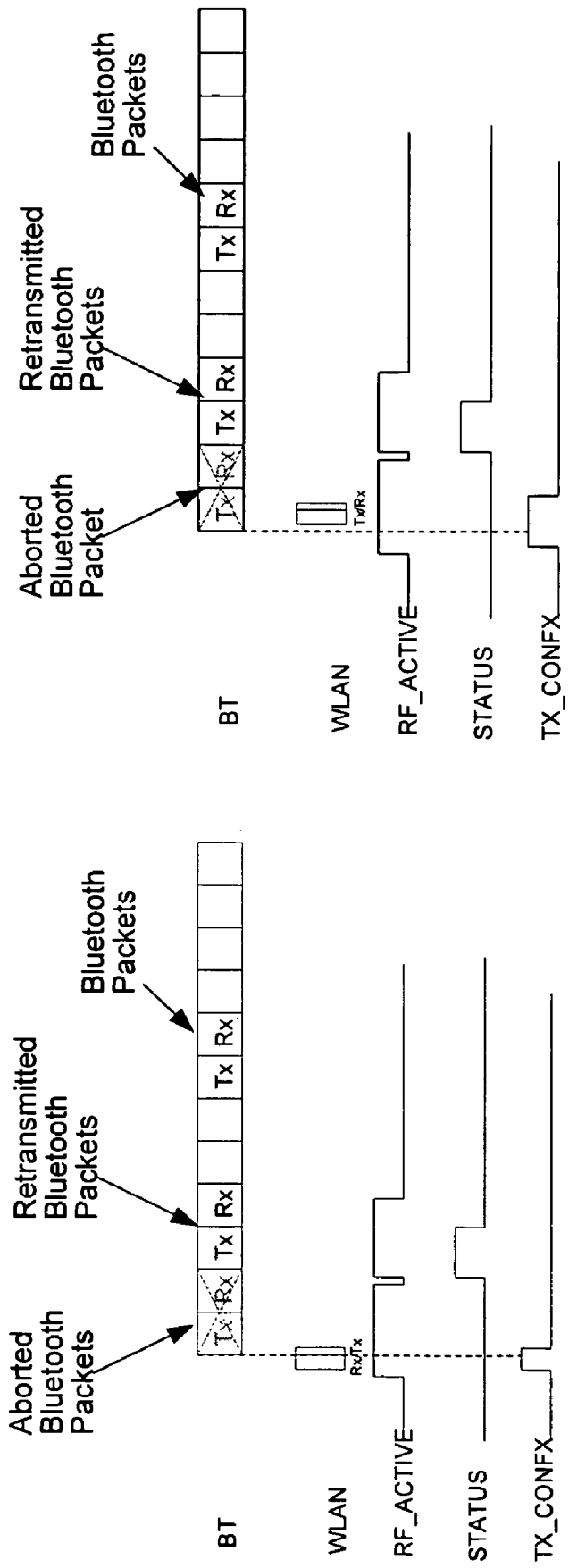
FIGS. 9A and 9B are timing diagrams according to an embodiment of the present invention showing the control signals of the controller for Bluetooth EV3 eSCO packet usage. Bluetooth packets that were aborted because they were scheduled to begin when an existing WLAN transmission was occurring in FIG. 9A or that were aborted because they were interrupted by a WLAN transmission in a prior occurring normal Bluetooth slot in FIG. 9B are assigned a higher priority for retransmission and are retransmitted in the following Bluetooth retransmission slots.

FIG. 6 shows the WLAN telephone 100A with the control module 610 that coordinates the operation of the Bluetooth transceiver 604, the WLAN transceiver 602, and the antenna switch 620 that selectively connects one or the other transceiver to the antenna 105A. FIG. 8 is a state diagram showing the operating states established by the control module 610 to assign a higher priority to the WLAN transmissions during normal Bluetooth slots and assign a higher priority to the Bluetooth retransmissions during Bluetooth retransmission slots. FIGS. 9A and 9B show the control signals of the control module 610 for Bluetooth EV3 eSCO packet usage. Bluetooth packets that were aborted because they were scheduled to begin when an existing WLAN transmission was occurring in FIG. 9A or that were aborted because they were interrupted by a WLAN transmission in a prior occurring normal Bluetooth slot in FIG. 9B are assigned a higher priority by the control module 610 for retransmission and are retransmitted in the following Bluetooth retransmission slots.

The WLAN transceiver 602 in FIG. 6 signals to the control module 610 with the WX signal when it is scheduled to transmit or is transmitting WLAN packets. The Bluetooth transceiver 604 signals to the control module 610 with the STATUS signal whether it has an aborted Bluetooth packet ready for retransmission. The control module 610 signals to the Bluetooth transceiver 604 with the TX_CONFX signal if it is to abort any transmission of an original Bluetooth packet. The control module 610 signals to the WLAN transceiver 602 with the BREX signal if it is to abort any scheduled WLAN packet transmission or abort transmitting any WLAN packets. The Bluetooth transceiver 604 also signals to the control module 610 with the RF_ACTIVE signal whether it is transmitting a Bluetooth packet. The Bluetooth transceiver 604 in FIG. 6 signals to the control module 610 with the FREQ signal to provide information when Bluetooth is hopping into restricted channel. The WLAN transceiver 602 signals to the control module 610 with the WFQ signal to provide its timing.

If the STATUS signal is low, then there is no aborted Bluetooth packet ready for retransmission. In response to when the WLAN transceiver 602 signals to the control module 610 with the WX signal that it is scheduled to transmit or is transmitting WLAN packets in combination with the STATUS signal being low, indicating that there is no aborted Bluetooth packet ready for retransmission, the control module 610 raises the TX_CONFX signal to the Bluetooth transceiver 604 causing it to abort any transmission of an original Bluetooth packet. This is shown in the state diagram of FIG. 8 and the timing diagrams of FIGS. 9A and 9B.

If the STATUS signal is high, indicating that there is an aborted Bluetooth packet ready for retransmission, then in response the control module 610 signals to the WLAN transceiver 602 with the BREX signal to abort any scheduled WLAN packet transmission or abort transmitting any WLAN packets. This enables the Bluetooth transceiver 604 to retransmit the aborted Bluetooth packet. This is shown in the state diagram of FIG. 8 and the timing diagrams of FIGS. 9A and 9B.

The control module 610, the WLAN transceiver 602, and the Bluetooth transceiver 604 of FIG. 6 can be a set of LSI circuit chips. The control module 610 can be implemented as a programmed microcontroller chip that contains all the components comprising a controller, including a CPU, RAM, some form of ROM to store program code instructions, I/O ports, and timers. The control module 610 can also be implemented as an Application-Specific Integrated Circuit (ASIC). Alternately, the control module 610 circuitry can be integrated into the LSI circuit chip of the Bluetooth transceiver 604 or integrated into the LSI circuit chip of the WLAN transceiver 602.

From the headset 101A point of view, when the terminal 100A is in receive mode, the headset 101A can transmit the eSCO packet to the terminal 100A during an eSCO slot. If the headset 101A did not receive the previous eSCO packet from the terminal 100A in the scheduled master-to-slave slot because of a WLAN transmission by the terminal 100A, the headset 101A will recognize the omission and set the acknowledge indication ARQN bit='0' in its reply eSCO packet. Although the terminal 100A may not receive the reply eSCO packet because of the WLAN transmission, it does not matter because the terminal 100A knows that its last prior eSCO transmission was preempted and it will use the eSCO retransmission window to retransmit the aborted eSCO packet. An advantage of the invention is that it does not require a change to the WLAN or Bluetooth standard, but merely a proprietary change to the Bluetooth side of the terminal 100A. The headset 101A, itself, operates according the hands free profiles for headsets, which support eSCO.

The state diagram 800 of FIG. 8 shows the operating states established by the control module 610 to assign a higher priority to the WLAN transmissions during normal Bluetooth slots and assign a higher priority to the Bluetooth retransmissions during Bluetooth retransmission slots. The state diagram 800 for terminal 100A begins in the quiescent State 802: where the terminal is waiting for traffic. In State 802, if Event 804 occurs where an original Bluetooth packet is scheduled for an eSCO transmission slot, then the state transitions to State 806 where the terminal is waiting for the eSCO slot to begin to enable transmitting the Bluetooth packet. In State 806, if Event 808 occurs where the terminal starts transmitting the Bluetooth packet, then the state transitions to State 810 where the terminal is actively transmitting the Bluetooth packet. In State 810, if Event 812 occurs where a higher priority WLAN packet begins transmitting, then Action 814 is taken where the terminal aborts transmitting the original Bluetooth packet and the state transitions to State 816 where the terminal buffers the aborted Bluetooth packet. In State 816, if Event 818 occurs where the terminal completes transmitting the WLAN packet, then the Action 820 is taken where the terminal retransmits the aborted Bluetooth packet in an eSCO retransmission slot and the state transitions back to the quiescent State 802 where the terminal is waiting for traffic. There is a second possible event that can occur in State 806. In State 806, if Event 822 occurs where a higher priority WLAN packet is scheduled to transmit, then Action 824 is taken where the terminal aborts the original Bluetooth packet and the state transitions to State 816. There is a second possible event that can occur in State 810. In State 810, if Event 826 occurs where terminal completes transmitting the Bluetooth packet, then the state transitions back to the quiescent State 802: where the terminal is waiting for traffic.

In State 802 of FIG. 8, if Event 834 occurs where an original WLAN packet is scheduled for a WLAN transmit slot, then the state transitions to State 836 where the terminal is waiting for the WLAN slot to begin to enable transmitting the WLAN packet. In State 836, if Event 838 occurs where the terminal starts transmitting the WLAN packet, then the state transitions to State 840 where the terminal is actively transmitting the WLAN packet. In State 840, if Event 842 occurs where a higher priority retransmission begins of an aborted Bluetooth packet, then Action 844 is taken where the terminal aborts the WLAN packet and the state transitions to State 846 where the terminal buffers the aborted WLAN packet. In State 846, if Event 848 occurs where the terminal completes retransmitting the aborted Bluetooth packet, then Action 850 is taken where the terminal retransmits the aborted WLAN packet and the state transitions back to the quiescent State 802 where the terminal is waiting for traffic. There is a second possible event that can occur in State 836. In State 836, if Event 852 occurs where a higher priority retransmission of an aborted Bluetooth packet is scheduled to transmit, the Action 854 is taken where the terminal aborts the WLAN packet and transitions to State 846. There is a second possible event that can occur in State 840. In State 840, if Event 856 occurs where the terminal completes transmitting the WLAN packet, then the state transitions back to the quiescent State 802 where the terminal is waiting for traffic.

The control module 610, the WLAN transceiver 602, and the Bluetooth transceiver 604 of FIG. 6 can include programmed microcontroller chips that contain all the components comprising a controller, including a CPU processor, RAM storage, some form of ROM to store program code, I/O ports, and timers.

The Bluetooth transceiver 604 of FIG. 6 can include a programmed microcontroller chip that stores in its ROM program code for execution by its processor for operating the Bluetooth transceiver in the Bluetooth network. The WLAN transceiver 602 of FIG. 6 can include a programmed microcontroller chip that stores program code in its ROM for execution by its processor for operating the WLAN transceiver in the WLAN network.

The control module 610 of FIG. 6 can include a programmed microcontroller chip that stores in its ROM program code for execution by its processor. The program code implements the method of the invention, for example as represented by the state diagram 800 of FIG. 8. The program code in the control module 610, when executed by its processor, assigns a higher transmission priority to WLAN packets than to Bluetooth packets when transmission of WLAN packets overlaps a first occurring transmission of Bluetooth packets, to abort transmission of the first occurring Bluetooth packets. The program code in the control module 610, when executed by its processor, assigns a higher transmission priority to the aborted Bluetooth packet than to the WLAN packets when transmission of the WLAN packets overlaps the retransmission of the aborted Bluetooth packet, to transmit the aborted Bluetooth packet.

In an alternate embodiment of the invention, after the headset connection has been established by the terminal and it performs a role switch to assume the master role, the terminal will set up an EV5 eSCO link with headset. The EV5 packet type enables power consumption in the headset to be reduced because the packets are sent less frequently and the protocol-to-packet overhead is smaller. The example parameters for the eSCO connection with EV5 packets are $T_{eSCO}=32$ slots and $W_{eSCO}=2$ using EV5 and CVSD voice coding.

The reason to select $T_{eSCO}=32$ slots is that with this value the EV5 eSCO packet is aligned at every 32 slots, which is the same time interval as the average interval of 20 ms for the VoIP WLAN packet. It should also be noted that with these parameters and the maximum EV5 packet data of 180 bytes, the average data rate is 72 kbps, which means that roughly every 12th packet does not have to be sent. Alternately, if a steady 64 kbps data rate is desired, a 160 byte payload can be used. This is not limited to any particular voice coding scheme, but can be used as long as the required data rate is below 72 kbps.

Although establishing the Bluetooth connection 106A with the terminal 100A as the master device is the preferred way to operate the invention, retaining the headset 101A in the role of the master device can also be used to establish the Bluetooth connection 106A. In this alternate embodiment, the terminal and headset are programmed so that the headset remains the master device in establishing the Bluetooth connection. As the master device, the headset will set up the EV3-type or EV5-type eSCO link with the terminal, which enables the headset to use the retransmission feature as described above.

In another alternate embodiment of the invention, the Enhanced Data Rate (EDR) Bluetooth packets can be used, as provided in the Bluetooth v2+EDR Specification. The EDR packets make it possible to increase the Bluetooth voice packet interval and thus to leave more time for WLAN packets to be transmitted. The EDR eSCO packets have the same retransmission control as described above for the Bluetooth v1.2 Specification eSCO packets and they have the advantage of transmitting at a raw data rate of from 2 Mbps to 3 Mbps. Both one-slot and three-slot EDR packets are available; the one-slot packet is preferred to keep latency to a minimum. The Bluetooth transceiver 604 in FIG. 6 signals to the control module 610 with the FREQ signal that BT is about to transmit on a restricted channel.

Figure 10:
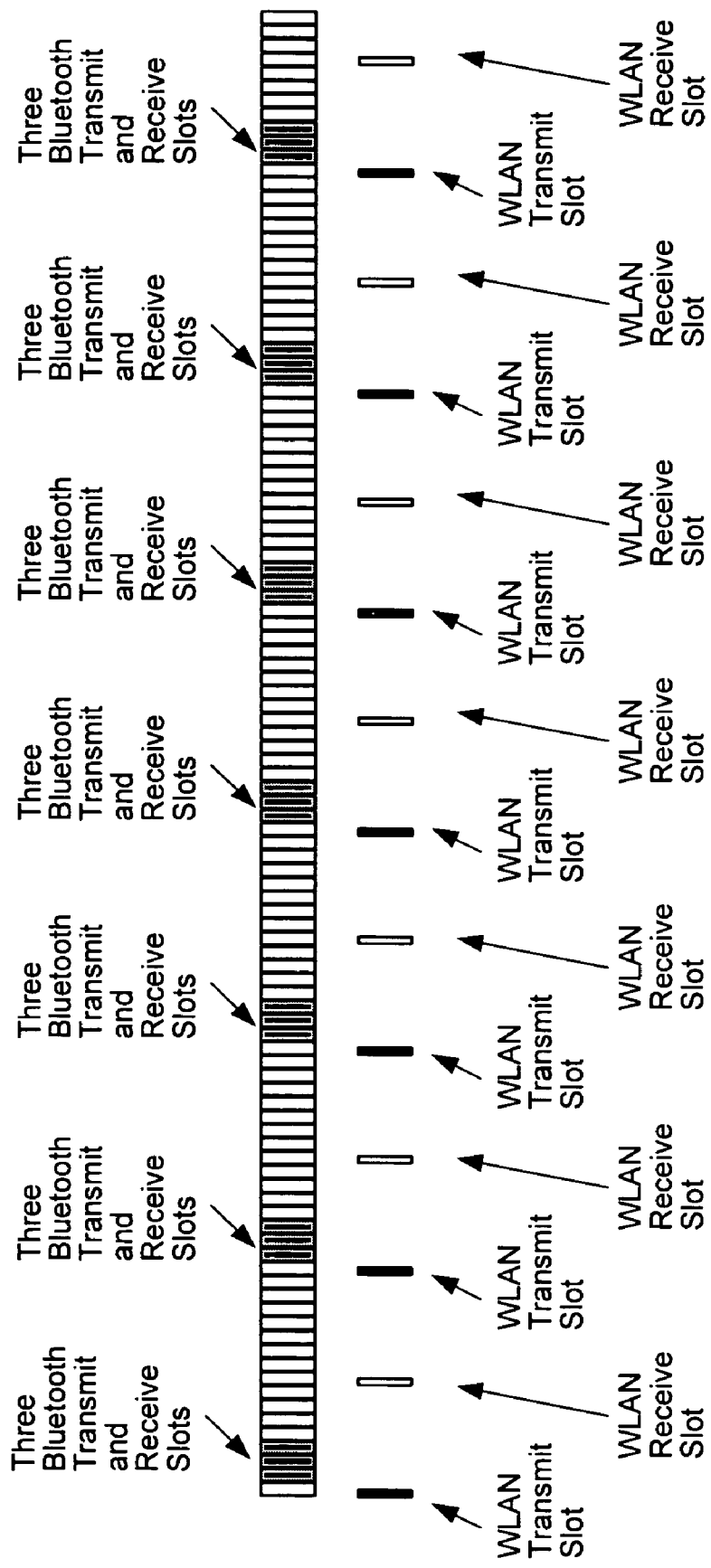
FIG. 10 is a timing diagram according to an embodiment of the present invention showing Bluetooth eSCO three-slot packets, which provide a reduced power consumption.
Figure 11:
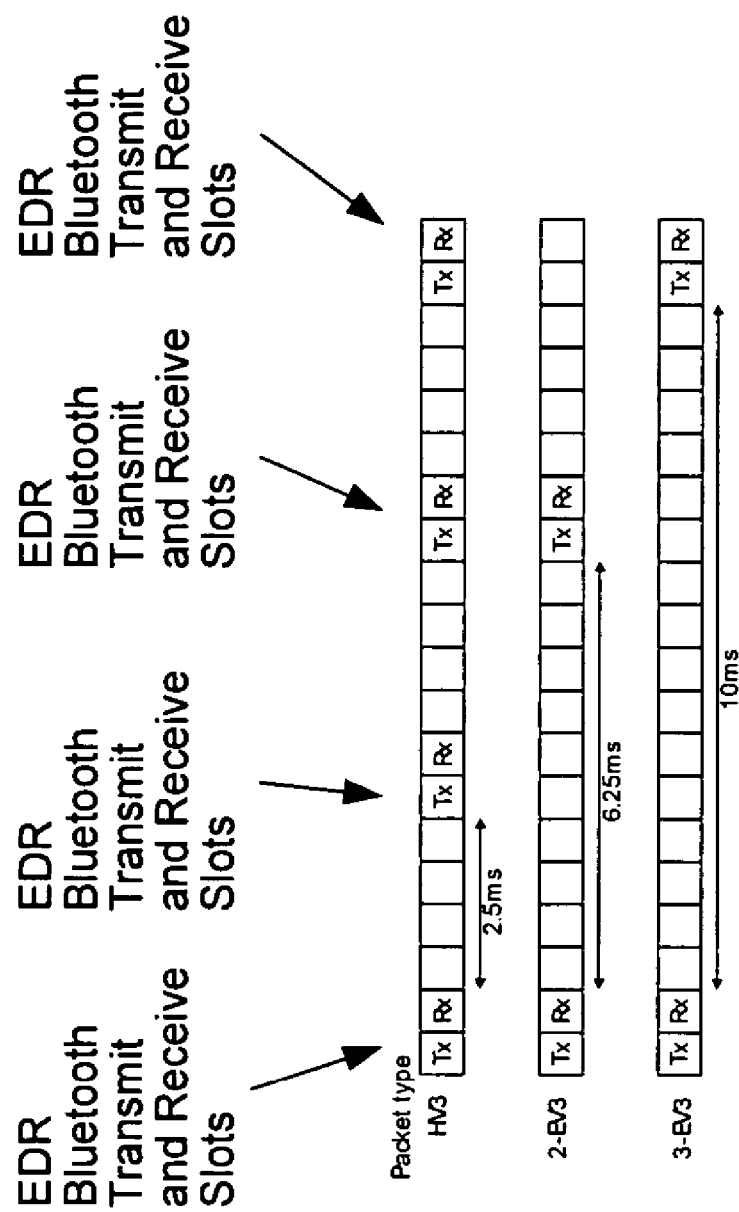
FIG. 11 is a timing diagram according to an embodiment of the present invention showing one-slot EDR packets, which can transmit at a data rate of up to 3 Mbps.

FIG. 10 shows the timing diagram of Bluetooth eSCO three-slot packets, which provide a reduced power consumption. FIG. 11 shows the timing diagram for one-slot EDR packets, which can transmit at a raw data rate of up to 3 Mbps.

The resulting invention solves the problem of reducing interference in simultaneous WLAN and Bluetooth signal handling, especially in voice over IP communications via a WLAN to a Bluetooth headset.

The resulting invention is particularly advantageous in areas of high WLAN traffic, such as in a business office, where frequent retransmission of interrupted WLAN packets would significantly impair WLAN traffic capacity. A further advantage of the invention is the ability of the terminal to predict the need to transmit Bluetooth packets because SCO and eSCO packets are transmitted at known fixed intervals. Still another advantage of the invention is that it does not require a change to the WLAN or Bluetooth standard, but merely a proprietary change to the Bluetooth side of the terminal.

Although specific embodiments of the invention have been disclosed, a person skilled in the art will understand that changes can be made to the specific embodiments without departing from the spirit and scope of the invention. For example the wireless terminal 100A can exchange with the wireless access point 140A IEEE 802.11 protocol data units containing data for other types of I/O devices, such as a printer or a bar code scanner, for example. The wireless terminal 100A can exchange encoded data in Bluetooth eSCO packets with a wireless I/O device such as a Bluetooth-enabled printer or a Bluetooth-enabled bar code scanner, for example. Additionally, the wireless PAN 106A connecting the terminal 100A to the headset 100A can operate in either a radiofrequency band, an infrared band, or an optical band.

What is claimed is:

1. A wireless terminal, comprising:
 a first transceiver operating in a wireless PAN network for communicating first data units in accordance with a first communications protocol and operating in a wireless communications band;
 a second transceiver operating in a wireless LAN network for communicating second data units in accordance with a second communications protocol and operating in a band substantially the same as said wireless communications band; and
 a controller coupled to said first and second transceivers, assigning a higher transmission priority to said second data units than to said first data units when transmission or retransmission of said second data units overlaps a first occurring transmission of said first data units, to abort transmission of said first occurring data unit;
 said controller assigning a higher transmission priority to said aborted first data unit than to said second data units when transmission of said second data units overlaps the retransmission of said aborted first data unit, to transmit said aborted first data unit.

2. The wireless terminal of claim 1, further comprising:
 said wireless PAN band being selected from the group consisting of radiofrequency band, infrared band, and optical band.

3. The wireless terminal of claim 1, further comprising:
 said first communications protocol conforms with Bluetooth protocol and said second communications protocol conforms with the IEEE 802.11 Wireless LAN Standard.

4. The wireless terminal of claim 1, further comprising:
 said first data units are Bluetooth eSCO packets and said second data units are IEEE 802.11 protocol data units.

5. The wireless terminal of claim 4, further comprising:
 said retransmission of said aborted first data unit is in an eSCO retransmission slot.

6. The wireless terminal of claim 1, further comprising:
 said wireless terminal exchanging voice over internet (VoIP) packets as said second data units with a wireless access point using IEEE 802.11 Wireless LAN Standard as said second communications protocol; and
 said wireless terminal exchanging encoded audio data in Bluetooth eSCO packets as said first data units with a wireless headset using Bluetooth protocol as said first communications protocol.

7. The wireless terminal of claim 1, further comprising:
 said wireless terminal exchanging voice over internet (VoIP) packets as said second data units with a wireless access point using IEEE 802.11 Wireless LAN Standard as said second communications protocol; and
 said wireless terminal exchanging encoded audio data in Bluetooth eSCO packets as said first data units with a wireless headset using Bluetooth EDR protocol as said first communications protocol.
 said wireless terminal establishing a connection with said headset and setting up an EDR packet eSCO link with said headset.

8. A method in a wireless terminal, comprising:
 operating a first transceiver in a wireless PAN network for communicating first data units in accordance with a first communications protocol and operating in a wireless communications band;
 operating a second transceiver in a wireless LAN network for communicating second data units in accordance with a second communications protocol and operating in a band substantially the same as said wireless communications band;
 assigning a higher transmission priority to said second data units than to said first data units when transmission or retransmission of said second data units overlaps a first occurring transmission of said first data units, to abort transmission of said first occurring data unit; and
 assigning a higher transmission priority to said aborted first data unit than to said second data units when transmission of said second data units overlaps the retransmission of said aborted first data unit, to transmit said aborted first data unit.

9. The method of claim 8, further comprising:
 said wireless PAN band being selected from the group consisting of radiofrequency band, infrared band, and optical band.

10. The method of claim 8, further comprising:
said first communications protocol conforms with Bluetooth protocol and said second communications protocol conforms with IEEE 802.11 Wireless LAN Standard.

11. The method of claim 8, further comprising:
said first data units are Bluetooth eSCO packets and said second data units are IEEE 802.11 protocol data units.

12. The method of claim 11, further comprising:
said retransmission of said aborted first data unit is in an eSCO retransmission slot.

13. The method of claim 8, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth eSCO packets as said first data units with a wireless headset using Bluetooth protocol as said first communications protocol.

14. The method of claim 8, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth eSCO packets as said first data units with a wireless headset using Bluetooth EDR protocol as said first communications protocol.
said wireless terminal establishing a connection with said headset and setting up an EDR packet eSCO link with said headset.

15. A system, comprising:
a wireless terminal;
a wireless headset;
a first transceiver in said wireless terminal operating in a wireless PAN network for communicating first data units in accordance with a first communications protocol to communicate with said wireless headset in a wireless communications band;
a wireless access point;
a second transceiver in said wireless terminal operating in a wireless LAN network for communicating second data units in accordance with a second communications protocol to communicate with said wireless access point in a band substantially the same as said communications band; and
a controller in said wireless terminal coupled to said first and second transceivers, assigning a higher transmission priority to said second data units than to said first data units when transmission or retransmission of said second data units overlaps a first occurring transmission of said first data units, to abort transmission of said first occurring data unit;
said controller assigning a higher transmission priority to said aborted first data unit than to said second data units when transmission of said second data units overlaps the retransmission of said aborted first data unit, to transmit said aborted first data unit.

16. The system of claim 15, further comprising:
said wireless PAN band being selected from the group consisting of radiofrequency band, infrared band, and optical band.

17. The system of claim 15, further comprising:
said first communications protocol conforms with Bluetooth protocol and said second communications protocol conforms with IEEE 802.11 Wireless LAN Standard.

18. The system of claim 15, further comprising:
said first data units are Bluetooth eSCO packets and said second data units are IEEE 802.11 protocol data units.

19. The system of claim 18, further comprising:
said retransmission of said aborted first data unit is in an eSCO retransmission slot.

20. The system of claim 15, further comprising:
said wireless terminal exchanging voice over internet (VoIP) packets as said second data units with said wireless access point using IEEE 802.11 Wireless LAN Standard as said second communications protocol; and
said wireless terminal exchanging encoded audio data in Bluetooth eSCO packets as said first data units with said wireless headset using Bluetooth protocol as said first communications protocol.

21. The system of claim 15, further comprising:
said wireless terminal exchanging voice over internet (VoIP) packets as said second data units with said wireless access point using IEEE 802.11 Wireless LAN Standard as said second communications protocol; and
said wireless terminal exchanging encoded audio data in Bluetooth eSCO packets as said first data units with said wireless headset using Bluetooth EDR protocol as said first communications protocol;
said wireless terminal establishing a connection with said headset and setting up an EDR packet eSCO link with said headset.

22. A chipset for a wireless terminal, comprising:
a first transceiver circuit chip operating in a wireless PAN network for communicating first data units in accordance with a first communications protocol in a wireless communications band;
a second transceiver circuit chip operating in a wireless LAN network for communicating second data units in accordance with a second communications protocol in a band substantially the same as said communications band; and
a controller circuit chip coupled to said first and second transceiver chips, assigning a higher transmission priority to said second data units than to said first data units when transmission or retransmission of said second data units overlaps a first occurring transmission of said first data units, to abort transmission of said first occurring data unit;
said controller assigning a higher transmission priority to said aborted first data unit than to said second data units when transmission of said second data units overlaps the retransmission of said aborted first data unit, to transmit said aborted first data unit.

23. The chipset for a wireless terminal of claim 22, further comprising:
said wireless PAN band being selected from the group consisting of radiofrequency band, infrared band, and optical band.

24. The chipset for a wireless terminal of claim 22, further comprising:
said first communications protocol conforms with Bluetooth protocol and said second communications protocol conforms with IEEE 802.11 Wireless LAN Standard.

25. The chipset for a wireless terminal of claim 22, further comprising:
said first data units are Bluetooth eSCO packets and said second data units are IEEE 802.11 protocol data units.

26. The chipset for a wireless terminal of claim 25, further comprising:
said retransmission of said aborted first data unit is in an eSCO retransmission slot.

27. The chipset for a wireless terminal of claim 22, further comprising:
said wireless terminal exchanging voice over internet (VoIP) packets as said second data units with said wireless access point using IEEE 802.11 Wireless LAN Standard as said second communications protocol; and
said wireless terminal exchanging encoded audio data in Bluetooth eSCO packets as said first data units with said wireless headset using Bluetooth protocol as said first communications protocol.

28. The chipset for a wireless terminal of claim 22, further comprising:
said wireless terminal exchanging voice over internet (VoIP) packets as said second data units with said wireless access point using IEEE 802.11 Wireless LAN Standard as said second communications protocol; and
said wireless terminal exchanging encoded audio data in Bluetooth eSCO packets as said first data units with said wireless headset using Bluetooth EDR protocol as said first communications protocol.
said wireless terminal establishing a connection with said headset and setting up an EDR packet eSCO link with said headset.

29. A computer program product for a wireless terminal, comprising:
program code for execution in a wireless terminal for operating a first transceiver in a wireless PAN network for communicating first data units in accordance with a first communications protocol in a wireless communications band;
program code for execution in the wireless terminal for operating a second transceiver in a wireless LAN network for communicating second data units in accordance with a second communications protocol in a band substantially the same as said communications band;
program code for execution in the wireless terminal for assigning a higher transmission priority to said second data units than to said first data units when transmission or retransmission of said second data units overlaps a first occurring transmission of said first data units, to abort transmission of said first occurring data unit; and
program code for execution in the wireless terminal for assigning a higher transmission priority to said aborted first data unit than to said second data units when transmission of said second data units overlaps the retransmission of said aborted first data unit, to transmit said aborted first data unit.

30. The program product of claim 29, further comprising:
said wireless PAN band being selected from the group consisting of radiofrequency band, infrared band, and optical band.

31. The program product of claim 29, further comprising:
said first communications protocol conforms with Bluetooth protocol and said second communications protocol conforms with IEEE 802.11 Wireless LAN Standard.

32. The program product of claim 29, further comprising:
said first data units are Bluetooth eSCO packets and said second data units are IEEE 802.11 protocol data units.

33. The program product of claim 32, further comprising:
said retransmission of said aborted first data unit is in an eSCO retransmission slot.

34. The program product of claim 29, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth eSCO packets as said first data units with a wireless headset using Bluetooth protocol as said first communications protocol.

35. The program product of claim 29, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth eSCO packets as said first data units with a wireless headset using Bluetooth EDR protocol as said first communications protocol.
said wireless terminal establishing a connection with said headset and setting up an EDR packet eSCO link with said headset.

36. A chipset for a wireless terminal, comprising:
a first transceiver circuit chip operating in a wireless PAN network for communicating first data units in accordance with a first communications protocol in a wireless communications band;
a second transceiver circuit chip operating in a wireless LAN network for communicating second data units in accordance with a second communications protocol in a band substantially the same as said communications band; and
said first transceiver circuit chip including a controller circuit coupled to said second transceiver chip, assigning a higher transmission priority to said second data units than to said first data units when transmission or retransmission of said second data units overlaps a first occurring transmission of said first data units, to abort transmission of said first occurring data unit;
said controller assigning a higher transmission priority to said aborted first data unit than to said second data units when transmission of said second data units overlaps the retransmission of said aborted first data unit, to transmit said aborted first data unit.

37. The chipset for a wireless terminal of claim 36, further comprising:
said wireless PAN band being selected from the group consisting of radiofrequency band, infrared band, and optical band.

38. The chipset for a wireless terminal of claim 36, further comprising:
said first communications protocol conforms with Bluetooth protocol and said second communications protocol conforms with IEEE 802.11 Wireless LAN Standard.

39. The chipset for a wireless terminal of claim 36, further comprising:
said first data units are Bluetooth eSCO packets and said second data units are IEEE 802.11 protocol data units.

40. The chipset for a wireless terminal of claim 39, further comprising:
said retransmission of said aborted first data unit is in an eSCO retransmission slot.

41. The chipset for a wireless terminal of claim 36, further comprising:

said wireless terminal exchanging voice over internet (VoIP) packets as said second data units with said wireless access point using IEEE 802.11 Wireless LAN Standard as said second communications protocol; and said wireless terminal exchanging encoded audio data in Bluetooth eSCO packets as said first data units with said wireless headset using Bluetooth protocol as said first communications protocol.

42. The chipset for a wireless terminal of claim 36, further comprising:

said wireless terminal exchanging voice over internet (VoIP) packets as said second data units with said wireless access point using IEEE 802.11 Wireless LAN Standard as said second communications protocol; and said wireless terminal exchanging encoded audio data in Bluetooth eSCO packets as said first data units with said wireless headset using Bluetooth EDR protocol as said first communications protocol.

said wireless terminal establishing a connection with said headset and setting up an EDR packet eSCO link with said headset.

* * * * *